(No Model.)  2 Sheets—Sheet 2.

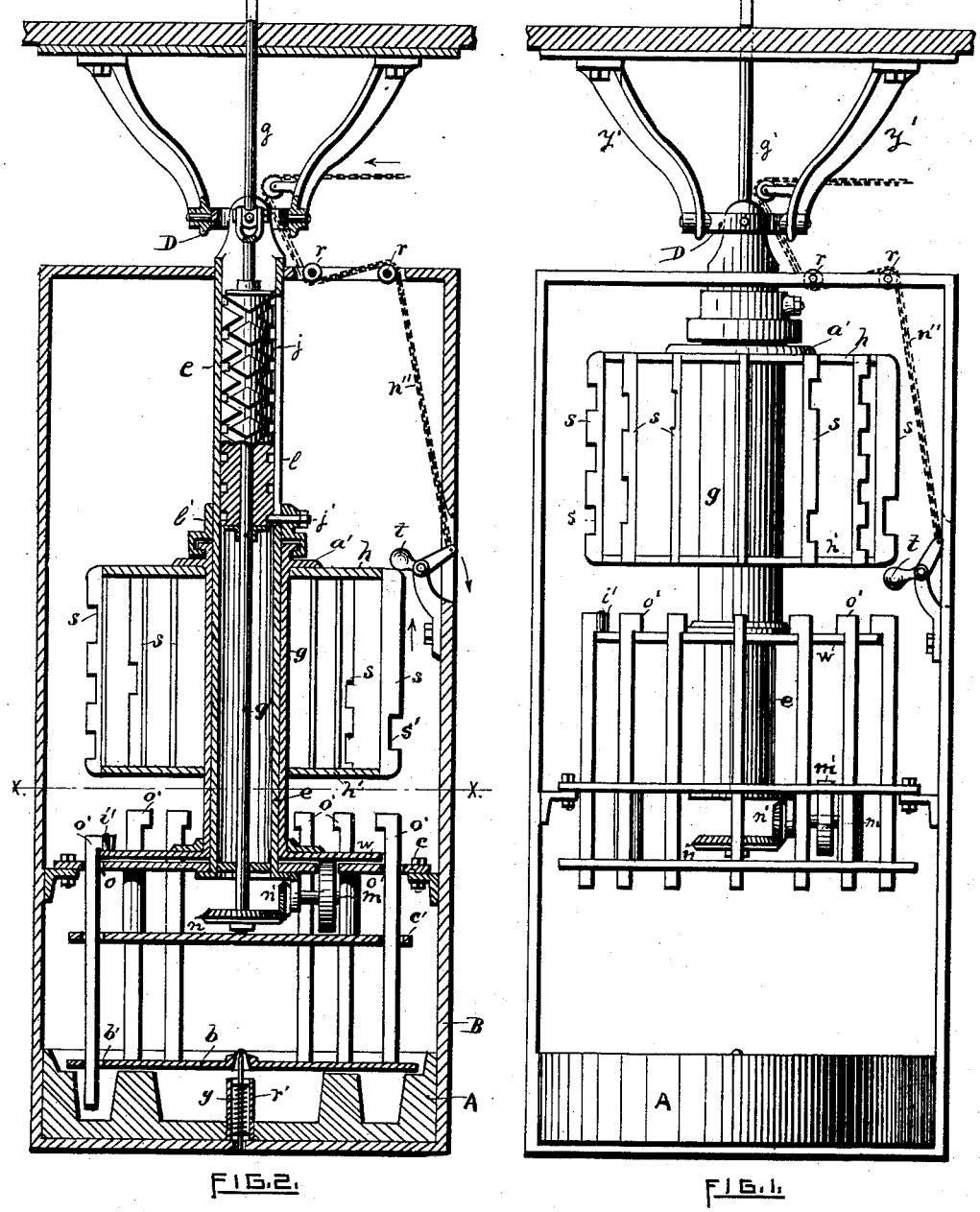

B. ARNOLD.
MARINER'S SIGNAL COMPASS.

No. 338,160.  Patented Mar. 16, 1886.

WITNESSES.  INVENTOR.

M. H. Arnold  Benj Arnold

M. C. Arnold

UNITED STATES PATENT OFFICE.

BENJAMIN ARNOLD, OF EAST GREENWICH, RHODE ISLAND.

MARINER'S SIGNAL-COMPASS.

SPECIFICATION forming part of Letters Patent No. 338,160, dated March 16, 1886.

Application filed May 20, 1885. Serial No. 166,213. (No model.)

*To all whom it may concern:*

Be it known that I, BENJAMIN ARNOLD, of East Greenwich, in the county of Kent and State of Rhode Island, have invented certain new and useful Improvements in Signal-Compasses; and I do hereby declare that the following is a full, clear, and exact description thereof, reference being had to the accompanying drawings, and to the letters of reference marked thereon, which form a part of this specification.

The object of my invention is to form a connection between a vessel's compass and a signaling apparatus, by means of which connection the compass shall automatically control the signals made and cause them to indicate the course of the vessel. It is illustrated in the accompanying drawings.

Figure 3:
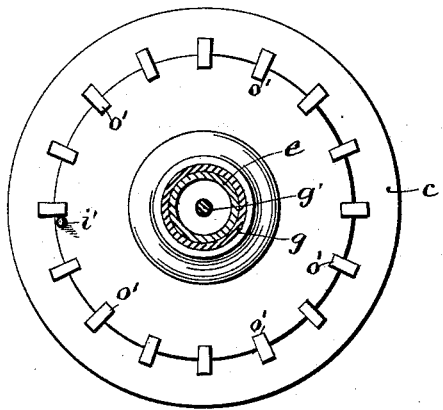
Figure 4:
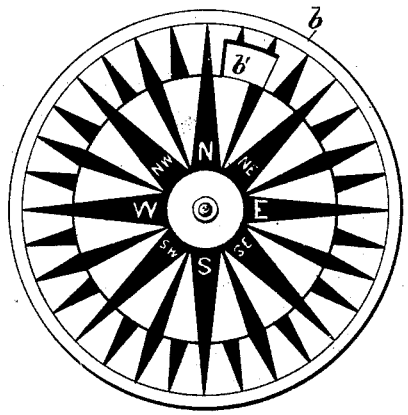

Figure 1 shows a front elevation of the apparatus. Fig. 2 is a vertical cross-section of the same. Fig. 3 shows a horizontal cross-section, taken through the line $x\,x$ in Fig. 1. Fig. 4 is a top view of the compass-card.

In the drawings, A indicates the compass, the case of which is attached to the bottom cross-bar of the frame B. $b$ is the compass needle and card suspended on a needle-point in the usual way, excepting that the pivot is supported on a light open spiral spring, $y$, to allow the needle and card to be depressed, so that they will rest on the parts of the case under them. A horizontal circular plate, $c$, is secured to the sides of the frame B, a short distance above the compass, and a little way below this plate there is a similar plate, $c'$, that is attached to the plate $c$ by studs. These two plates $c$ and $c'$ have each a circle of oblong openings, $o$, made in them near their outer edges. There may be four, eight, sixteen, or thirty-two of these openings, according to the number of points of the compass to be included in each separate signal. A set of flat bars or pins, $o'$, are made to slide freely in the openings $o$ in the two plates $c\,c'$, which are placed so that the openings will correspond in the two plates. These pins $o'\,o'$ have broad heads on the inner sides of their upper ends. A tube, $e$, has its lower end secured to the center of the plate $c$ and its upper end pivoted with a universal joint to the hangers $y'$, which are rigidly made fast to some part of the vessel. Upon this universal joint the frame B, with the compass and all the devices held in the frame, is supported with perfect freedom to swing a certain distance in all directions, to allow the compass to preserve its proper level undisturbed by the motions of the vessel. This joint of the tube $e$ is constructed in the usual way with a ring, D, pivoted on two opposite sides to the standards $y'$, and also pivoted to the tube $e$ on the two sides at right angles to the pivots in the hangers $y'$. A short tube, $g$, is made to slide freely over the tube $e$ and carry a circular plate, $h$, made fast to its upper end. At a short distance below the plate $h$ a similar plate, $h'$, is secured to the tube $g$. These two plates $h\,h'$ have each a set of recesses made in their peripheries, agreeing in number with the openings $o$ in the plates $c$ and $c'$. A set of flat bars, $s$, are placed in the recesses in the plates $h\,h'$, their upper ends being fastened in the upper plate, $h$, and their lower ends to the lower plate, $h'$. These bars $s\,s$ are divided on their outer edges into projections by recesses $s'$, made in them, each bar having its own particular number of recesses and projections and lengths of the same. A plain circular plate, $w$, is attached to the lower end of the tube $g$. This plate $w$ is just large enough in diameter to turn inside of the openings $o$ in the plate $c$, so that the heads of the pins $o'\,o'$ will project in over the plate $w$ and be drawn up with it when it is raised. A vertical shaft, $g'$, is placed in the center of the tube $e$, turning in bearings at the end of the tube, and also in the plate at the top to which the hangers are attached. A bevel-gear, $n$, is made fast to the lower end of the shaft $g'$, which engages in a bevel-gear, $n'$, secured on the inner end of a short horizontal shaft, $m$, held in bearings on the under side of the plate $c$, and a friction-pulley, $m'$, made fast on the shaft $m$, projects up through an opening in the plate $c$, far enough above the face of the plate to allow the plate $w$ to rest on the face of the pulley $m'$ when that plate is at its lowest point, and be turned around by it. A universal joint is made in the shaft $g'$ where it passes through the ring D of the joint of the tube $e$, before described.

This joint allows that part of the shaft $g'$ in the tube $e$ to swing with that tube, while the upper part of the shaft retains its position between the hangers.

A small cylinder, $j$, with a right-hand screw-thread and a left-hand screw-thread crossing each other made on it, is made fast on the shaft $g'$ in the tube $e$, and a T-shaped follower, $j'$, made to slide in the screw-threads, has a pivot on its back that extends out through a slot, $l$, made in the tube $e$, and through a bearing in the upper end of the carrier $l'$, which is made to slide freely up and down on the tube $e$. Extensions on each side of the lower end of the carrier $l'$ are made to catch under the flat rim of a circular flange secured to the plate $h$. This makes a connection between the carrier $l'$ and the plate $h$, and the parts attached to it are moved up and down on the tube $e$ by the follower $j'$ in the screw-threads of the cylinder $j$, without interfering with their rotary motion.

A lever, $t$, is held in a bracket attached to the side of the frame B. The inner end of this lever carries a friction-roll, and the lever is so placed that when the plates $h$ $h'$ rise, the bar $s$ that is opposite to the lever $t$, will strike against the roll and push back that end of the lever, depressing the other end, to which the chain $n''$, that operates the signal, is attached. The chain $n''$ is carried from the end of the lever $t$ up over pulleys $r$ $r$ in the frame B, and through the ring D of the universal joint in tube $e$, for the purpose of preventing the swinging of the apparatus from lengthening or shortening the chain or the distance it has to pass to reach the valve of the whistle or other signaling device which it operates.

Fig. 4 shows the compass-card with an opening, $b'$, made through it, also shown in section in Fig. 2.

The operation of the apparatus, which may not be fully understood by the foregoing description of the devices, is as follows: A slow rotary motion is given to the shaft $g'$ by connecting it with the vessel's motor or other source of power that may be convenient. This motion is conveyed through the bevel-gears $n$ $n'$ to the shaft $m$ and friction-pulley $m'$, and also to the screw-cylinder $j$ in the tube $e$. As the cylinder $j$ revolves, when that part of the follower $j'$ that slides in the groove (which part is made too long to be reversed at the crossing of the threads on the cylinder) is tipped over by coming to the end of that thread, and catches in the reverse thread, the follower is carried down by it to the bottom of the cylinder, to be reversed again in like manner as at the top, and again carried up. This up-and-down motion of the follower $j'$ is communicated through the carrier $l'$ to the sliding tube $g$ and the devices attached to it. The plate $w$ descends with the pins $o'$ hanging by their heads upon it until their points rest on the compass-card $b$, excepting the pin that is over the opening $b'$ in the card. This pin will continue to descend with the plate $w$, and its head will still rest on the plate, while the other pins will be held up with their heads clear of the plate by their points resting on the compass-card. When the plate $w$ gets clear down, it rests on the friction-pulley $m'$, which, as before stated, has a rotary motion, that revolves the plate $w$ and the tube $g$, with its devices, until the pin $i'$ in the plate comes in contact with the head of the pin that still rests on the plate $w$. (See Fig. 2.) The heads of all the other pins, $o'$, being held up clear of the plate and the pin $i'$, it will be readily seen that the pin that has dropped into the opening in the card will, by means of the stop-pin $i'$, hold the plate $w$ at that point until the follower $j'$ raises the plate clear of the friction-pulley $m'$, and it again descends. As the plates $h$ $h'$ rise, that bar $s$ that has been stopped opposite to the lever $t$ by the stop-pin $i'$ in the plate $w$, and the head of the pin $o'$ that dropped into the opening in the compass-card, will move the lever $t$ as it passes it, in accordance with the projections and recesses in the bar $s$, and operate the signal with corresponding intermissions through the chain $n''$. If the course of the vessel is not changed during the time of the rising and descending of the plates $h$ $h'$ and pins $o'$, the same pin will again drop through the opening in the card $b$, and hold the plate $w$ so it will not rotate at all; but if the course of the vessel is changed the whole apparatus will change its position, excepting the compass-card. This will bring another one of the pins, $o'$, over the opening $b'$, and this pin will in its turn drop into that opening and stop the plate $w$, so that the corresponding signal-bar $s$ will be brought opposite to the lever $t$, and operate the signal accordingly. In this way the course of the vessel will be indicated by the proper signal, and the chain $n''$ may be connected at the same time with a steam-whistle and an electric-light shade at the mast-head, so that the time of the exposure of the light and the sound of the whistle will agree, and when circumstances prevent one from being noted the other may be observed.

To prevent injury to the pivot of the compass-needle by the weight of the pins $o'$ resting on the card $b$, the spring $y$ under it is made just stiff enough to support the card and needle alone, and the slightest pressure of the pins $o'$ $o'$ on the card depresses it so that it will rest on the compass-case, as before stated.

Having thus described my improvements, what I claim as my invention is—

1. The combination, with a compass, of a series of movable pins and suitable mechanism to move the pins toward and from the compass card or needle, substantially as and for the purpose set forth.

2. The combination of a compass and a series of pins with a set of signal-bars and suitable mechanism for operating the pins and signal-bars, substantially as and for the purpose specified.

3. The combination of the tube $e$, plates $c$ and $c'$, sliding tube $g$, plates $h\ h'$, bars $s\ s$, pins $o'\ o'$, and plate $w$, substantially as described, and for the purpose set forth.

4. The combination of the shaft $g'$, shaft $m$, friction-pulley $m'$, and plate $w$, with pin $i'$, the plate $c$, and pins $o'\ o'$, substantially as and for the purpose set forth.

5. In an apparatus for controlling signals by means of a compass, a compass-card having an aperture made in it, as described, with the drop-pins $o'$, plate $w$, pin $i'$, bars $s\ s$, and lever $t$ and suitable intermediate mechanism, substantially as and for the purpose set forth.

6. In an apparatus for controlling signals by means of a compass, the combination of a compass-card having an aperture in it, as described, with a pivot for the compass-needle capable of being depressed, and a series of pins, $o'\ o'$, substantially as and for the purpose specified.

BENJ. ARNOLD.

Witnesses:
M. H. ARNOLD,
M. C. ARNOLD.